Nov. 28, 1961   P. M. ROBERSON ET AL   3,010,159
APPARATUS FOR CLEANING SEED COTTON
Filed Jan. 18, 1960   4 Sheets-Sheet 1
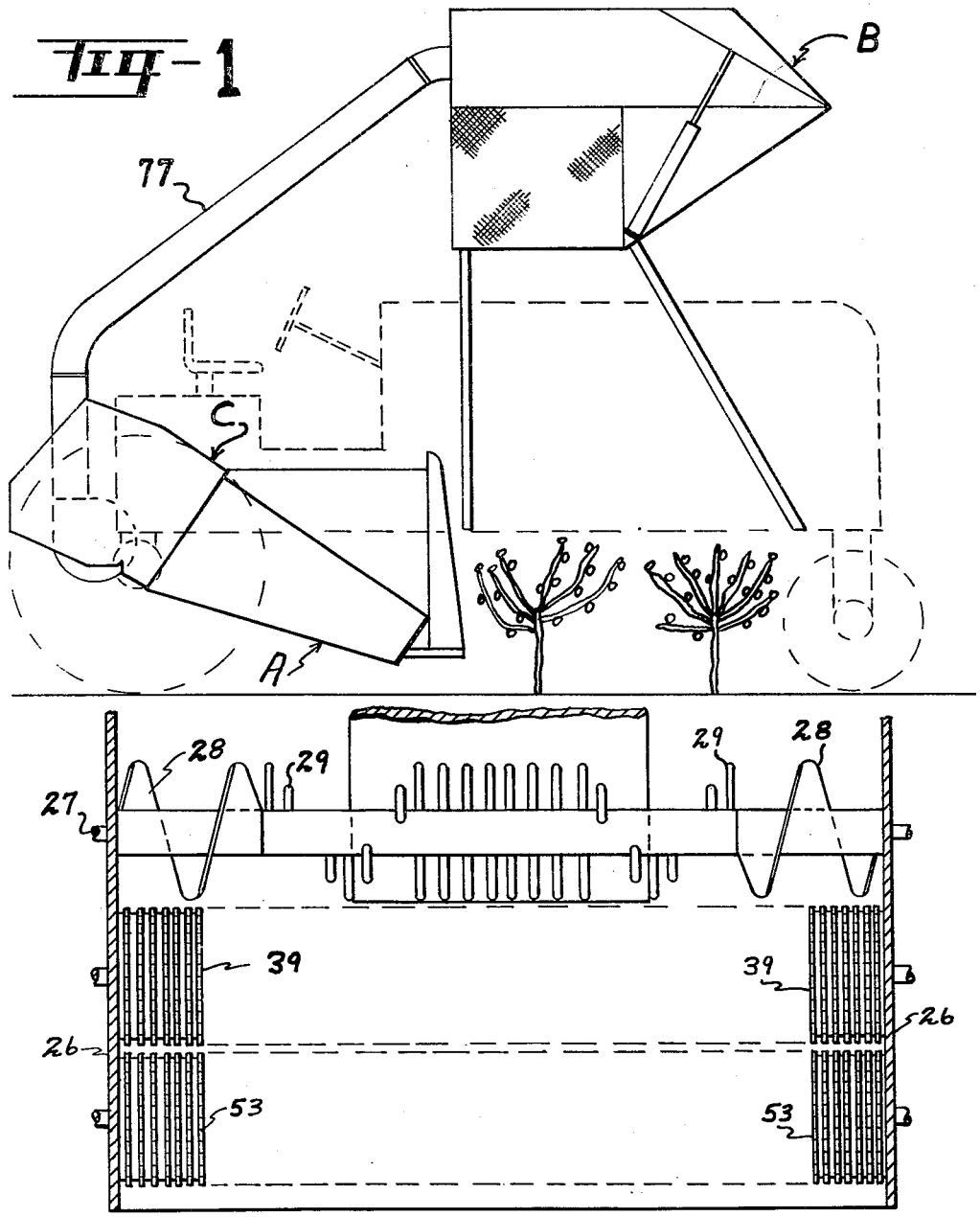
INVENTORS
Perry M. Roberson
Robert A. Waddail
BY
Jennings, Carter & Thompson
Attorneys

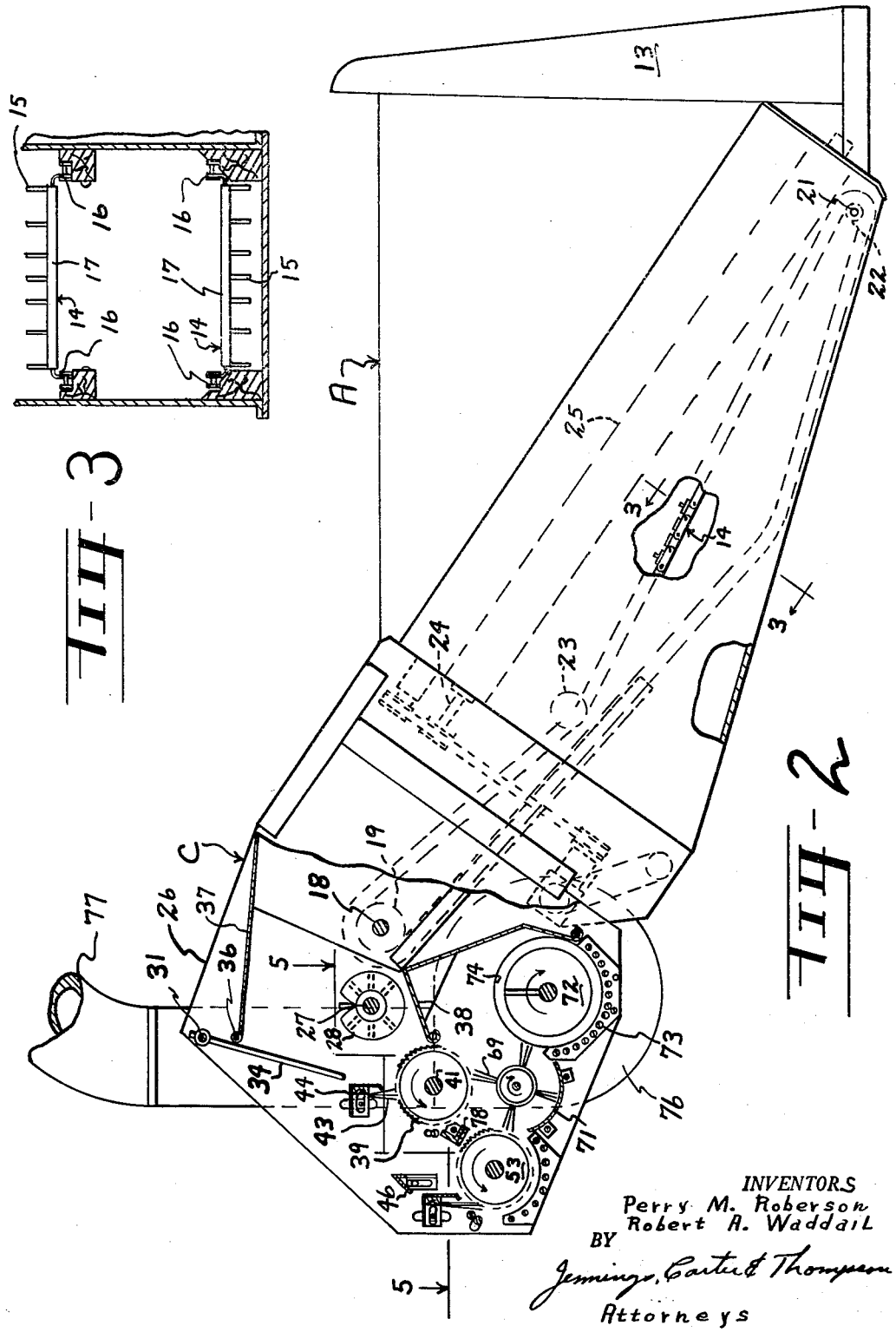

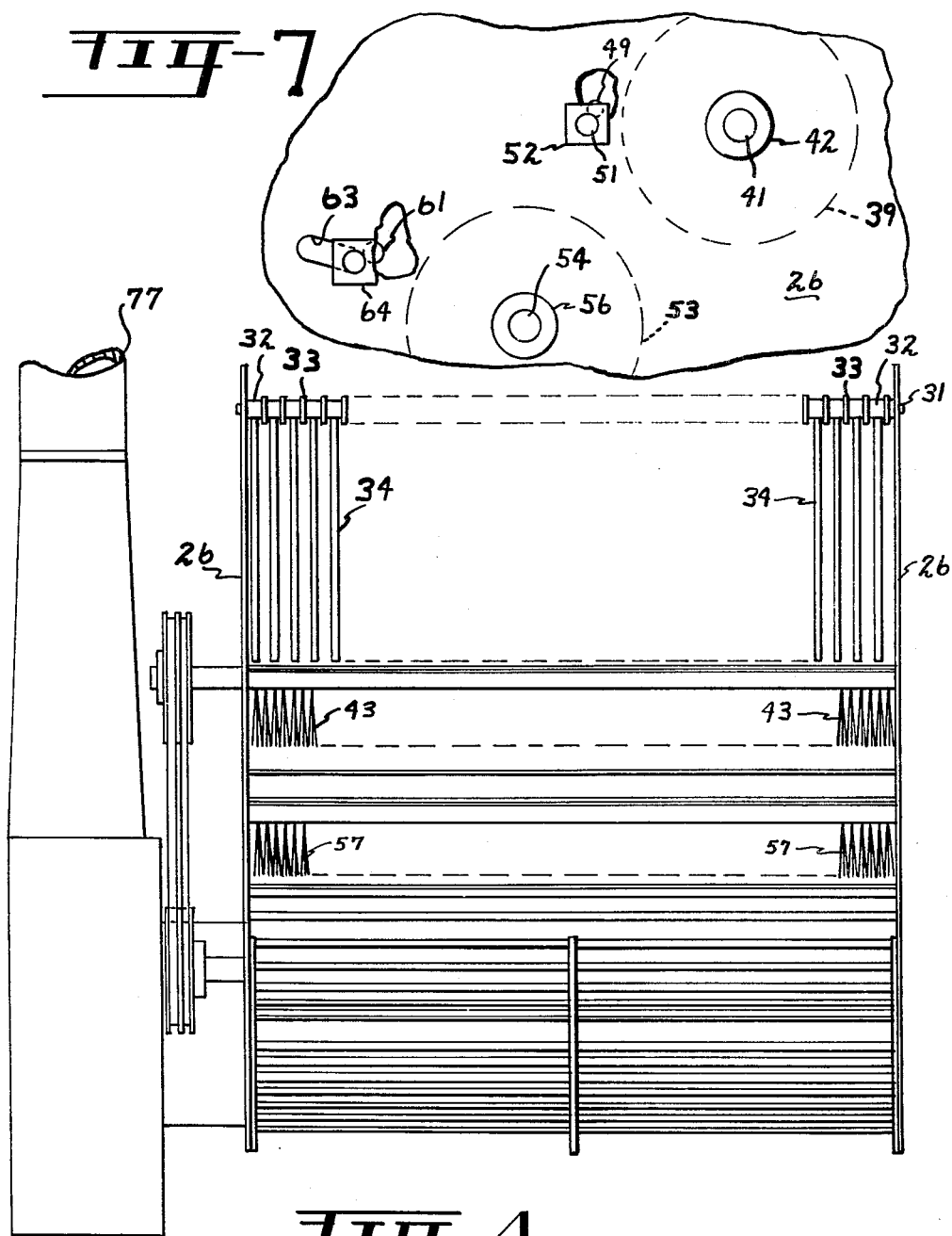

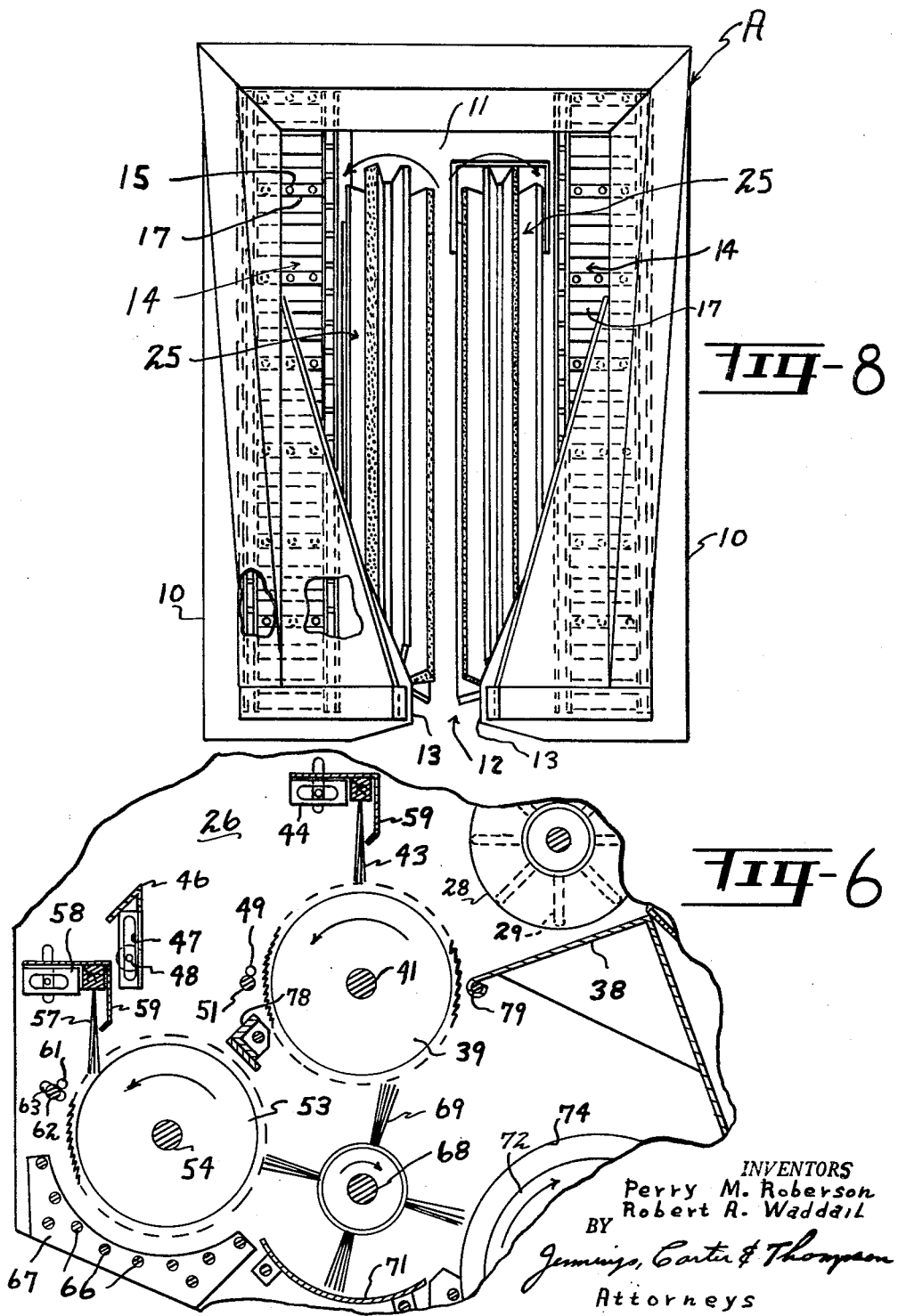

United States Patent Office 3,010,159
Patented Nov. 28, 1961

3,010,159
APPARATUS FOR CLEANING SEED COTTON
Perry M. Roberson, Columbus, Ga., and Robert A. Waddail, Phenix City, Ala., assignors to Lummus Cotton Gin Company, a corporation of Georgia
Filed Jan. 18, 1960, Ser. No. 3,035
5 Claims. (Cl. 19—67)

Our invention relates to apparatus for removing from machine gathered cotton the usual kinds of trash found therein such as sticks, burs, leaves, stems and the like.

An object of our invention is to provide apparatus especially adapted for association with a vehicle mounted cotton gatherer or picker of the kind in which the cotton together with portions of the cotton plant are more or less stripped from the stalk, our apparatus being located to receive the cotton and trash from the picking apparatus and then to separate the trash and cotton and deliver the cotton to a hopper.

An object of our invention is to provide which shall be more efficient for the intended purposes than apparatus heretofore known to us, one of which shall be entirely portable in the sense of being attached to the portably mounted picker, and an apparatus which is particularly effective in removing stems and sticks from the seed cotton prior to delivering it to the hopper.

Another object is to provide apparatus of the character designated in which there are a plurality of saw cylinders, one disposed above the other, together with means associated with each saw cylinder to aid in cleaning the cotton being carried around thereby, there being a common doffer for both the saw cylinders which is effective to remove from the peripheries of the cylinders clean cotton and deliver it into a conveyor for subsequent delivery to the storage hopper.

Briefly, our improved apparatus comprises a housing located rearwardly, delivery-wise, of the picker. The cotton containing the trash is delivered first to a kicker cylinder having a plurality of pins projecting therefrom and is thrown thereby against a generally vertically arranged series of grid bars, spaced far enough apart to permit a large part of the trash to pass between them, but close enough to prevent the cotton from going through. Located beneath the grid bars is a toothed cylinder which engages the cotton and carries in around under a stationary member such as a brush, the latter serving to dislodge some of the trash clinging to the cotton. The trash so dislodged is thrown outwardly by centrifugal force over a baffle which is vertically adjustable. Located near the periphery of the saw cylinder is a fixed bar which is struck by the cotton carried around by the saw cylinder thereby to dislodge still more of the trash. A second saw cylinder is located below and laterally displaced from the first saw cylinder and receives cotton thrown off the first saw cylinder. The second saw cylinder has associated therewith a brush and a bar similar to the first mentioned ones. In addition, the cotton on the second saw cylinder passes over an arcuate grid of bars arranged parallel to the saw cylinder, thus to subject the cotton thereon to another beating and cleaning action. A common doffer in the form of a rotating brush engages the two saw cylinders and cotton from the saw cylinders is thrown directly into a screw conveyor leading from a side of the housing to a suction fan which blows the cotton to a hopper. Any locks or bolls of cotton which remain on the first named saw cylinder are knocked therefrom by a stationary strike plate or member to fall either into the conveyor, directly, or down onto the doffer brush, thereby to be eventually deposited in the conveyor for moving on to the hopper.

Apparatus illustrating features of our invention is shown in the accompanying drawings forming a part of this application, in which:

FIG. 1 is a wholly diagrammatic view showing our invention in association with a cotton picker and a storage hopper and mounted on a tractor;

FIG. 2 is a side elevational view, partly broken away and in section;

FIG. 3 is a detailed sectional view taken generally along line 3—3 of FIG. 2;

FIG. 4 is a fragmental rear elevational view of our improved cleaner;

FIG. 5 is an enlarged detail sectional view taken generally along line 5—5 of FIG. 2;

FIG. 6 is an enlarged sectional view of a portion of our improved apparatus and illustrating the relative disposition of the saw cylinders and doffer;

FIG. 7 is a fragmental side elevational view illustrating the means of attaching the beater bars associated with the saw cylinders; and, FIG. 8 is a front view of the cotton picker which is located in front of our improved apparatus.

Referring now to the drawings for a better understanding of our invention, we show the same in association with a cotton picker of known type indicated generally by the letter A, and a storage hopper for the picked, cleaned cotton indicated generally by the letter B. Our improved apparatus is indicated generally by the letter C in FIG. 1.

The picker A may embody a housing having side walls 10 and a rear wall 11. The front of the picker is open as indicated at 12 whereby the apparatus may proceed down a row of cotton as illustrated in FIG. 1 and the top of the cotton plant with the cotton thereon enters the opening 12. Rounded guides 13 at the front aid the entry of the cotton into the picker.

At each side of the picker housing are conveyors 14. The conveyors 14 comprise chains 16 having cross slats 17. An upper driven shaft 18 carries sprockets 19 over which the chains pass. At the lower end of the picker is an idling shaft 21 having rollers 22 thereon over which the chains likewise are passed. Hold-down idling rollers 23 are provided for the upper flight of the chain as illustrated in dotted lines in FIG. 2.

Mounted on suitable shafts 24 are brush and rotatable paddle picker units indicated generally by the numerals 25 and which are effective when the cotton plant enters the picker A to throw the cotton together with some of the stems, leaves, trash and the like onto the respective conveyors 14. Some of the slats 17 may have pins or spikes 15 thereon to aid in conveying the cotton upwardly.

From what has been said so far it will be seen that the cotton is picked up by the unit A as the machine advances down the row. The cotton proper as well as some of the sticks, leaves, trash and the like are thrown by the units 25 onto the upwardly inclined conveyors 14.

The unit C, which embodies our invention, comprises a casing having generally vertically directed side walls or heads 26. The casing may be open at its back and at the bottom as shown in the sectional view, FIG. 2.

Located adjacent the shaft 18 is a shaft 27. On the shaft 27, adjacent its ends, inside the heads or plates 26, are short sections of screw conveyor 28. The pitch of these conveyors is such that cotton delivered from the upper end of the conveyors 14 moves inwardly. A series of spirally arranged pins 29 is also provided on the shaft 27 whereby the cotton is engaged by the pins. The shaft 27 is rotated at a relatively high speed whereby cotton, sticks, and the like delivered thereto are thrown rearwardly, that is, to the left as viewed in FIG. 2 of the apparatus.

Mounted between the heads or end plates 26 is a shaft

31. Mounted for loose and independent rotation on the shaft 31 are a plurality of short lengths of pipe 32 and between the pipes 32 are spacer washers 33. Secured to each of the short lengths of pipe 32 is a depending grid bar 34. The grid bars hang generally vertically and are stopped against forward movement by means of a bar 36 on the end of a cover plate 37 at the top of the housing. The spacing of the bars 34 is such that there is provided a grid which will permit a large amount of trash to pass therethrough and yet which is so closely spaced as to prevent passage of cotton. It will likewise be noted that each of the grid bars 34 is so mounted that the lower ends thereof are free for independent rearward movement.

Immediately below the kicker roll assembly is a plate 38 which slopes downwardly and rearwardly. Located below the grid bars and at the lower end of the plate 38 is a first saw cylinder 39 supported for rotation on a shaft 41. The shaft is supported in suitable bearings 42 made fast to the end plates 26.

Mounted above the saw cylinder 39 is a brush-like member 43 supported from the heads 26 on a slotted bracket 44. The brush 43 is directed generally radially of the saw cylinder 39 and serves the purpose of brushing the cotton being carried around on the saw cylinder 39 to remove some of the loose trash therefrom. It will be noted that the ends of the brush are located close to the periphery of the saw cylinder. The saw cylinder is driven in the direction indicated by the arrow thereon.

Rearwardly of the saw cylinder 39 is located a baffle 46. The top of the baffle 46 is substantially on a horizontal line passing across the top of the saw cylinder 39. The baffle 46 may be vertically adjustable by means of a slot 47 and a lock screw 48 passing through the head 26.

Located adjacent the periphery of saw cylinder 39 is a beater or stripper bar 49. The bar 49 is supported on a rod 51 which passes through openings in the heads 26 and may be secured by means of nuts 52 as shown in FIG. 7. The bar and rod 49 and 51 may be secured together along their lengths by welding as required. By loosening the nuts 52 at each end of the rod 51 the bar 49 may be moved closer or farther from the periphery of the saw cylinder 39.

Mounted below the saw cylinder 39 and rearwardly spaced therefrom is a second saw cylinder 53. The saw cylinder 53 is supported on shaft 54 in turn mounted in bearings 56 secured to the side walls 26. The saw cylinder 53 is provided with a brush 57 likewise supported in a slotted bracket 58 from the inner walls of the side plates 26. It will be noted that the brush 57 is directed more nearly tangential to the periphery of the saw cylinder 53 than is the brush 43 relative to saw cylinder 39. Each of the brushes 43 and 57 may be provided with an elongated sheet metal plate 59 extending in front of the bristles. These plates prevent undue deflection of the bristles in a rearward direction by reason of material striking the same.

The saw cylinder 53 is provided with a stripper or beater bar 61 mounted on a rod 62 that passes through slots 63 in the heads 26. Nuts 64 on threaded ends of the rod 62 serve to hold the rod against rotation and hence hold the stripper bar 61 in proper relation relative to the saw cylinder 53.

Beneath the saw cylinder 53 is a grid work composed of bars 66 mounted in suitable brackets 67 fastened to the inner surfaces of the heads 26. These grid bars are spaced far enough apart to permit the ready discharge of dirt, trash and the like through the same but yet are close enough to prevent cotton from falling therethrough. Therefore, as cotton is being carried around on the cylinder 53 it is given a final beating and cleaning action against the grid bars 66.

Mounted on a shaft 68 is a driven doffer in the form of a brush 69 which serves both of the saw cylinders 39 and 53. A curved plate 71 is located beneath the brush 69 to close the housing therebeneath.

Mounted alongside the brush 69 and forwardly thereof is a screw conveyor 72. The screw conveyor has an arcuate grid underneath the same composed of rods 73 which are relatively closely spaced. The screw conveyor discharges through an opening 74 in one of the plates 26 and into the eye of a suction fan 76. The suction fan 76 delivers the cotton through a duct 77 to the storage hopper B.

Extending between the saw cylinders 39 and 53 is an angled shaped member 78. The member 78 serves the purpose of holding the cotton on the saw cylinder 39 until it reaches the doffer and thus assures delivery of the cotton on the saw cylinder 39 to the doffer. The end of the plate 38 may be rounded as indicated at 79 and may lie close to the periphery of the saw cylinder 39.

From the foregoing the method of constructing and using our improved apparatus may now be explained and understood. With cotton being picked and delivered to the kicker roller the same is thrown with considerable force against the loosely mounted grid bars 34. At this point much of the trash such as sticks, leaves, stems, loose burs and the like, pass through the grid bars rearwardly of the machine and fall onto the ground. The cotton and the remaining trash drop by gravity from the bars 34 down onto the upper saw cylinder 39. The saw teeth of the cylinder 39 engage the cotton and carry it around under the brush 43. The brush 43 contacts the cotton while on the saw cylinder, loosening still more of the trash, particularly the light trash which is embedded in the cotton. The centrifugal action of the saw 39 is such that the lighter trash is thrown over the baffle 46 and onto the ground rearwardly of the machine. The stripper bar 49 serves the purpose of knocking loose from any cotton on the saw cylinder 39 green bolls and loose burs as well as some sticks that are adhering to the cotton thereon. The angle 78 not only seals between the saw cylinders 53 and 39 to prevent direct passage of material to the doffer but also, as stated, holds the cotton or better embeds it in the teeth of the saw 39 until the doffer contacts it. Cotton, some sticks and other trash, striking the baffle 46 fall next onto the saw cylinder 53. The cotton is picked up by the saw cylinder and carried around where it is brushed by the lower brush 57 and passes between the stripper bar 61. It will be noted that the stripper bar 61 is set farther from the periphery of its saw than is the stripper bar 49 from saw 39. The reason for this is that by the time the cotton reaches the lower saw cylinder it is desired that all of it remain on that saw cylinder until the doffer brush 69 removes it. In passing around over the grid bars 66 cotton on saw cylinder 53 is given a second beating and cleaning action. The doffer doffs the cotton from both saw cylinders and throws it into the conveyor 72. The grid bars 73 afford a final opportunity for the sifting out of any trash that may fall by gravity.

From the foregoing it will be apparent that we have devised an improved apparatus for cleaning seed cotton and one which is particularly adapted for association with a cotton picking apparatus. In actual practice we have found our machine to be extremely effective. By impelling the cotton and trash toward the grid made up of the bars 34 and then by brushing the cotton while on the saw cylinders we eliminate large amounts of the trash normally found with such cotton.

While we have shown our invention in but one form, it will be obvious to those skilled in the art that it is not so limited but is susceptible of various changes and modifications without departing from the spirit thereof, and we desire, therefore, that only such limitations shall be placed thereupon as are specifically set forth in the appended claims.

What we claim is:

1. In a seed cotton cleaner, a casing having generally vertical side walls, a rotary kicker in the upper end of the casing to which cotton and trash are delivered, a grid located away from the kicker against which the trash and cotton are thrown from the kicker and of a spacing to permit trash to pass therethrough and thence out of the casing while preventing the passage of cotton, upper and lower rotating saw cylinders, the upper one being located below the grid to receive cotton falling downwardly therefrom, the second saw cylinder being located to receive cotton thrown off the upper saw cylinder, flexible means associated with each saw cylinder effective to engage the cotton being carried around thereon thereby to loosen trash clinging to the cotton, at least one beater bar located close enough to the periphery of each saw cylinder to be struck by cotton being carried around on the saw cylinders, a baffle located above the second saw cylinder and in the path of cotton thrown from the first saw cylinder, means to adjust the baffle vertically whereby its upper edge lies below the trajectory of some of the trash thrown from the first saw cylinder, means to doff cotton from the saw cylinders, and a conveyor located to receive cotton from the doffing means and take it from the casing.

2. In apparatus for cleaning seed cotton, a casing having generally vertical side walls and open along its rear side and bottom, a rotary kicker roller in the upper front part of the casing to which seed cotton containing trash is delivered, a grid rearwardly of the kicker roller formed of a plurality of individually hinged generally vertical rods spaced apart far enough to permit passage of trash and close enough to prevent passage of seed cotton, a rotary saw cylinder located rearwardly of the kicker roller and below the grid to receive cotton falling from the grid and rotating with its upper surface moving toward the rear open end of the casing, an elongated flexible brush-like member associated with the saw cylinder and substantially in contact with the saw cylinder along a line of the periphery thereof adjacent the top of the saw cylinder, a beater bar located below the brush and disposed to be engaged by cotton being carried around on the saw cylinder, a baffle located rearwardly of the saw cylinder with its upper edge at an elevation for trash thrown off the saw cylinder to pass thereover and thence out of the casing, a second rotary saw cylinder below and rearwardly of the first named one and rotating in the same direction as the first named saw cylinder, an elongated brush-like member associated with the second saw cylinder and substantially in contact along the periphery thereof on the downgoing side of the second saw cylinder, a beater bar associated with the second saw cylinder and located near the rear open end of the casing and disposed to be struck by cotton being carried around on the second saw cylinder, a grid located under the second saw cylinder, a presser member between the saw cylinders disposed to press cotton onto the first saw cylinder, a common doffer for the saw cylinders, and means to carry from the casing cotton removed by the doffer.

3. Apparatus as defined in claim 2 in which the beater bars are adjustable toward and from the peripheries of their respective saw cylinders.

4. Apparatus as defined in claim 2 in which there is a downwardly and inwardly sloping plate beneath the kicker roller which terminates close to the periphery of the first named saw cylinder.

5. Apparatus as defined in claim 2 in which the brush-like members are adjustably mounted for movement toward and from the peripheries of their respective saw cylinders thereby to vary the amount of brushing action given the cotton.

References Cited in the file of this patent
UNITED STATES PATENTS 2,898,635     Vandergriff _____ Aug. 11, 1959
2,902,722     Wallace _____ Sept. 8, 1959